May 31, 1927.

S. LIPSIUS

SHEET FEEDER

Filed Feb. 19, 1926

1,630,707

INVENTOR
Samuel Lipsius,
BY
ATTORNEY

Patented May 31, 1927.

1,630,707

UNITED STATES PATENT OFFICE.

SAMUEL LIPSIUS, OF NEW YORK, N. Y.

SHEET FEEDER.

Application filed February 19, 1926. Serial No. 89,295.

This application is a partial continuation from 705,415 filed April 10, 1924.

The main object is to provide simple and reliable mechanism for transferring sheets from a Miller feeder attachment on a printing press or similar feeder to a machine for powdering, bronzing or drying or similar work. In detail I have sought to provide mechanism of this character which can be associated with such powdering or other machine and which can be readily connected with or disconnected from a press or feeder attachment and adjusted to varying heights.

In carrying out the invention I provide a conveyor which is hinged at one end. The other end is inclined and adapted to be associated with a press or feeder attachment. Adjacent this end are located stops for receiving the sheets to be deposited on the carrier or conveyor and causing the sheets to be delivered on to the conveyor regularly and uniformly. Adjusting means is provided to adapt the mechanism to various conditions.

Fig. 2 is a longitudinal sectional view of the same showing the mechanism associated with a Miller feeder attachment or the like.

Figure 1:
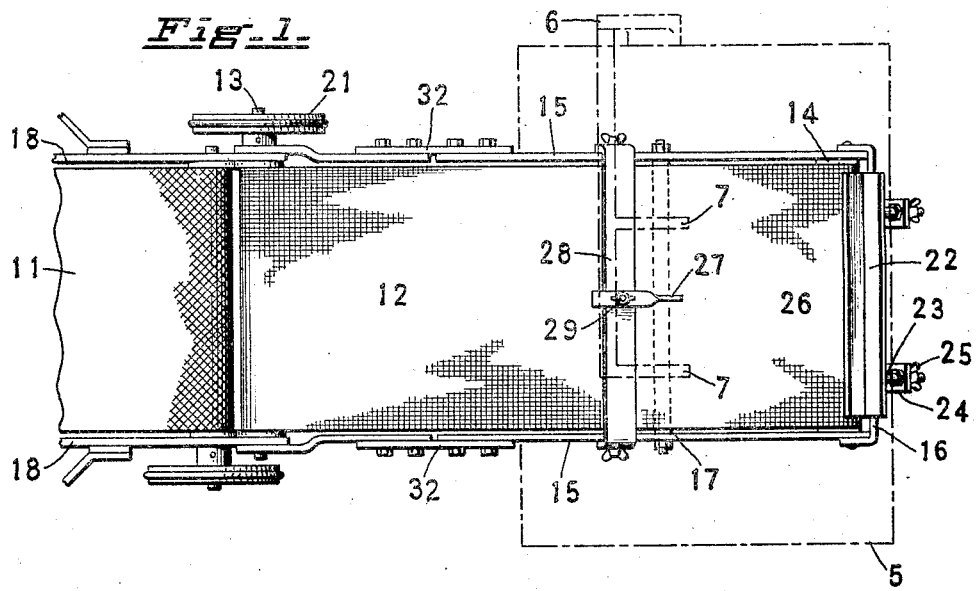
Fig. 1 is a plan view of mechanism embodying improvements of my invention.

The construction of the feeder attachment is immaterial to my present invention but for convenience I have illustrated a fragment of the body or delivery end 5 of a machine provided with an ordinary oscillating arm 6 and gripping jaws 7 for carrying the sheets 10 of paper or the like from the printing press. 11 indicates a fragment of a carrier or conveyor of any machine such as a powdering, bronzing or drying machine.

The conveyor 12 is preferably of canvas travelling on rollers 13 and 14 at opposite ends. These rollers together with the side bars 15 and the end bar 16 and intermediate guide rolls or bars 17 constitute what may be termed a frame which is hinged about the axis of the roller 13. The roller 13 may conveniently be carried in the side frames 18 of the machine for subsequently treating the sheets.

The conveyors are adapted to be driven in any suitable manner as for instance by a motor 19, a counter shaft 20 and suitable belts or chains leading to the pulley or sprocket 21 on the end of the roller 13 so that the conveyor 12 may be driven at a suitable speed. The conveyor frame being hinged at one end may be tilted to various heights as shown by the dot and dash lines of Fig. 2.

Figure 2:
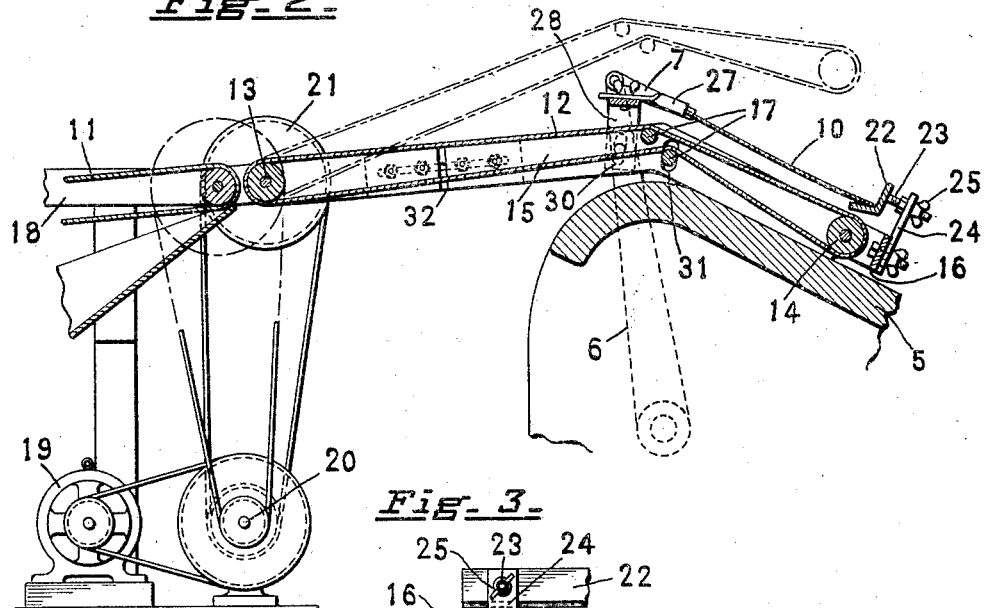
Figure 3:
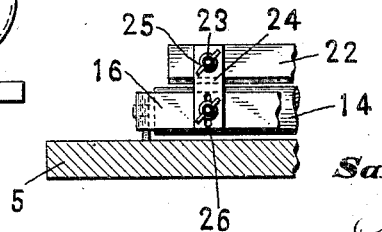
Fig. 3 is a fragmentary end view of the attachment.

At the movable end of the conveyor frame I mount an abutment or stop 22 which is preferably of angular cross section so as to provide not only an inclined supporting surface but also a rear wall for positioning the rear end of the sheet 10 as shown in Fig. 2. This stop 22 is carried by threaded stems 23 which extend through the uprights 24 and are clamped in place by nuts 25 when the stop is in the proper position. The uprights 24 are slotted at 26 so that they can be moved up and down to adjust the stop 22 the desired distance away from or near the conveyor 12.

The stop 27 is secured to a cross piece 28 on the conveyor frame forwardly of the stop 22 and at a greater distance from the conveyor surface than the stop 22. This limits the forward motion of the sheet 10 and serves to ensure its disengagement from the jaws 7. The shank of the stop 27 is slotted at 29 so that it can be adjusted back and forth. The ends of the cross piece 28 are slotted at 30 to permit adjustment up and down. When the sheet is disengaged from the jaws 7 its front end is dropped on the conveyor which carries it forward.

The apparatus is so constructed that the receiving end of the conveyor 12 is normally inclined and the stops 22 and 27 are arranged at such elevations that they are brought into play when the sheet is in an inclined position as shown in Fig. 2 with its rear end close to the conveyor and inclined upwardly toward its forward end. The rear stop 22 serves to support the rear end of the sheet during the interval of time required for the gripping jaws 7 to release the sheet so that its front end will be sure to settle on to the conveyor before the rear end of the sheet. Without some such arrangement it is impossible to operate such a device at high speed without frequently having the sheets turned over due to the rear end striking the moving surface of the conveyor before the front end. My arrangement however ensures having the sheet strike the conveyor in such a way that it is impossible for the sheets to turn over even when operating at high speed under normal commercial operating conditions.

One of the shafts or guides 17 may be mounted in slots 31 so that it can be adjusted to tighten the belt or conveyor 12. I also prefer to make the sides 15 in two parts connected by a slotted connection 32 so that the length of the side bars may be adjusted to keep the belt tight and running smoothly.

I anticipate that many changes may be made in the details of construction and arrangement and that the construction of the stops may be materially modified without departing from the spirit or scope of my invention.

The mechanism in its preferred form is so designed that it may be readily detached from the printing press so that the press may be used independently when desired or the feeding attachment may be applied to the printing press when it is desired to subsequently treat the sheets as for instance in bronzing, embossing or drying machines.

I claim:

1. A conveyor frame, a conveyor carried thereby, a paper stop carried by said frame and having a member above said conveyor and a rear stop member above the conveyor for supporting a sheet until the gripper has released the front end of the sheet.

2. A conveyor frame, a conveyor carried thereby, a paper stop carried by said frame and having a member above said conveyor and a rear stop member above the conveyor for supporting a sheet until the gripper has released the front end of the sheet, and means for adjusting said rear stop member longitudinally of said conveyor.

3. A conveyor having an inclined receiving end, a rear paper stop mounted above said conveyor and a front paper stop above and further away from said conveyor.

4. A conveyor having an inclined receiving end, a rear paper stop mounted above said conveyor and a front paper stop above and further away from said conveyor, one of said stops being adjustable longitudinally with respect to said conveyor.

5. A hinged frame, a conveyor carried thereby and having an inclined receiving end and an angular paper stop carried by said frame above one end of said conveyor for supporting a sheet until the front end of the sheet has been released.

6. A hinged frame, a conveyor carried thereby and having an inclined receiving end and an angular paper stop carried by said frame above one end of said conveyor for supporting a sheet until the front end of the sheet has been released, and means for adjusting said stop longitudinally of said conveyor.

7. A hinged frame having guide rolls at its opposite ends and intermediate guides offset from the plane of said rolls, a conveyor travelling on said rolls and guides and a rear paper stop carried by said frame adjacent one of said rolls.

8. A hinged frame having guide rolls at its opposite ends and intermediate guides offset from the plane of said rolls, a conveyor travelling on said rolls and guides and a rear paper stop carried by said frame adjacent one of said rolls and a forward stop adjacent one of said guides.

9. A hinged frame having guide rolls at its opposite ends and intermediate guides offset from the plane of said rolls, a conveyor travelling on said rolls and guides and a rear paper stop carried by said frame adjacent one of said rolls and a forward stop adjacent one of said guides and means for adjusting one of said stops with respect to the other, the forward stop being further away from said conveyor than said rear stop.

10. In a machine of the character described an inclined canvas conveyor having an inclined receiving end, an angular stop arranged immediately above the lower end of said conveyor, and another stop opposite said angular stop for limiting the forward movement of a sheet deposited upon said conveyor.

11. The combination of a pivoted conveyor frame, a conveyor carried thereby, a paper stop carried by said frame above and adjacent said conveyor and a second stop carried by said frame above said conveyor and spaced apart from said first stop and further above from said conveyor than said first stop.

12. The combination of a pivoted conveyor frame, a conveyor carried thereby, a paper stop carried by said frame adjacent said conveyor and a second stop carried by said frame spaced apart from said first stop and further away from said conveyor than said first stop, one of said stops being adjustable with respect to the other stop.

13. A hinged frame having guide rolls at its opposite ends and intermediate guides offset from the plane of said rolls, a conveyor travelling on said rolls and guides and a rear paper stop carried by said frames above one of said rolls, and a forward stop above one of said guides, the forward stop being further away from said conveyor than said rear stop.

14. A hinged frame having guide rolls at its opposite ends and intermediate guides offset from the plane of said rolls, a conveyor travelling on said rolls and guides and a rear paper stop carried by said frames adjacent one of said rolls, a forward stop adjacent one of said guides and means for adjusting one of said stops with respect to the other.

15. A conveyor comprising a belt, a rear sheet stop and a front stop adjustable toward and from the rear stop and toward and from the belt.

16. A conveyor comprising a belt having end guides and an intermediate guide so disposed with respect to the other guides that the active surface of the belt has one end inclined relative to the other, a sheet stop at one end of the conveyor and another stop mounted adjacent the intermediate guide.

SAMUEL LIPSIUS.